Oct. 14, 1958  B. L. CHAPIN ET AL  2,856,157
MASONRY DRILLS
Filed Sept. 19, 1955  2 Sheets-Sheet 1

INVENTOR.
BERNARD L. CHAPIN
BY RALPH H. ALPER

Dike, Thompson & Sanborn
ATTORNEYS

Oct. 14, 1958   B. L. CHAPIN ET AL   2,856,157
MASONRY DRILLS

Filed Sept. 19, 1955   2 Sheets-Sheet 2

INVENTORS
BERNARD L. CHAPIN
BY RALPH H. ALPER

Dike, Thompson & Sanborn
ATTORNEYS

United States Patent Office 2,856,157
Patented Oct. 14, 1958

2,856,157

MASONRY DRILLS

Bernard L. Chapin, Winchester, and Ralph H. Alper, Brighton, Mass., assignors to New England Carbide Tool Company, Inc., Cambridge, Mass., a corporation of Massachusetts Application September 19, 1955, Serial No. 535,008

5 Claims. (Cl. 255—69)

This invention relates to masonry drills and more particularly to a drill having a removable cutting head and other separable parts.

A rotary core barrel type masonry drill has a cutting head on its head end and flutes which are usually helical and formed of lands and grooves on its external surface for removing masonry particles from the hole being drilled. Particularly in the case of drills of the larger diameters and longer lengths for drilling large deep holes, the drill structure is heavy, cumbersome and expensive to handle and ship. Since the cutting head is formed integrally with the core barrel, the entire structure must be scrapped when the cutting head wears out, or else the entire drill must be shipped when the cutting head is to be re-worked.

Accordingly, it is desirable and therefore an object of this invention to provide a masonry drill in which the cutting head is removable and therefore interchangeable by the provision of simple, inexpensive means for attaching the cutting head to the core barrel and also to provide a drill structure in which sections of core barrel may be attached together so that the drill structure is adaptable for long and short holes, may be dismantled for shipping, and in which worn out cutting heads may be replaced without scrapping the entire structure.

It will be appreciated that when barrel-shaped sections of a drill which are fluted by lands and grooves on their external surfaces are screwed together the lands or raised portions of one of such parts may obstruct the passages formed by the grooves of an adjacent part and therefore block the free passageway for the masonry particles. Due to inaccuracies of machining and also the presence of masonry particles and other foreign matter, when the parts are screwed together, the final relative rotative position of the parts which are screwed together cannot be predicted. Accordingly, it is an object of the invention to provide free passageways for masonry particles between the grooves of adjacent attached parts in any relative rotative positions between them.

Figure 1:
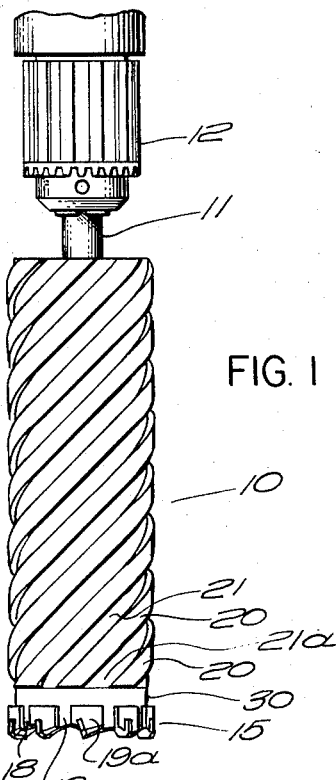
Fig. 1 is an elevation view of the assembled structure of the invention.

The preferred form of the masonry drill of the invention shown in the drawings includes a hollow core barrel 10 which has a shank 11 with which it may be integrally formed or which is preferably attached to the top of the barrel 10 by screw threaded engagement, and by which it is secured to the chuck 12 of a conventional drill head (not shown). A removable cutting head 15 has hardened inserts 16 which are sharpened to form cutting teeth arranged circularly around its head end and which, when cutting a hole in masonry, forms masonry particles and dust which must be removed from the hole. For the latter purpose, the cutting head 15 is fluted with grooves 18 which extend back from its head end between lands 19 which support the cutting teeth 16.

The core barrel 10 has flutes formed of helical lands 20 and grooves 21 which extend between the ends of the core barrel 10, the grooves 21 being open at their ends and forming passages for removing masonry particles.

Figure 2:
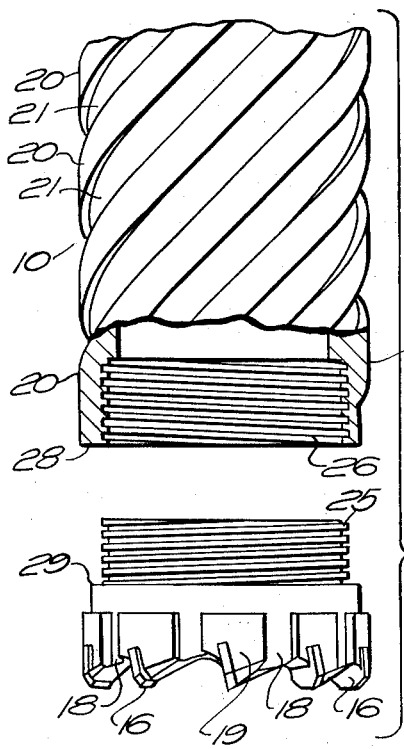
Fig. 2 is an enlarged partial elevation view of the parts of the structure separated from each other.
Figure 3:
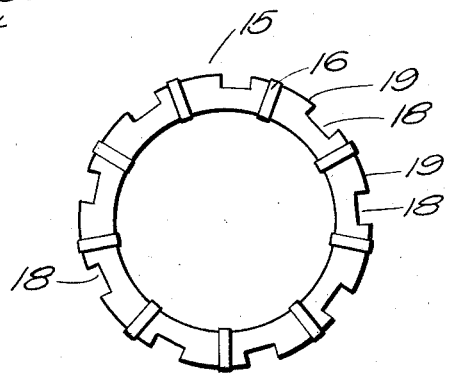
Fig. 3 is a bottom plan view of the removable cutting head of the invention.

I have found that the cheapest, simplest and strongest means for axially attaching the cutting head 15 to the core barrel 10 comprises engageable threads on the respective parts, illustrated in Fig. 2 as external threads 25 on the rear end of the cutting head 15 which engage with internal threads 26 on the head end of the core barrel 10. When the parts are screwed up until the head end surface 28 of the core barrel 10 abuts a rear end surface 29 on the cutting head 15, the attachment between the parts is rigid and strong. Nevertheless it will be seen that unless unduly time consuming and expensive care is taken in the relationship between the forming of the threads 25 and 26, the surfaces 28 and 29 and the grooves 18 and 21, the ends of the land portions 20 might readily be found opposite the groove portions 18 when the parts are screwed together, and that the groove portions 18 and 21 of the respective parts did not match, thereby obstructing the passageways for clearing and removing the masonry particles, which condition would render the drill useless.

Accordingly, I have provided an annular recess 30 on the cutting head 15 which crosses its lands 19 and thereby joins its grooves 18 together and which preferably has the same diameter as the diameter of the groove portions 18 taken together, the latter being also preferably of the same diameter as the groove portions 21 taken together. Therefore, when the cutting head 15 is screwed up solid to the core barrel 10 as seen in Fig. 1, the recess 30 forms an unobstructed passage through which particles may pass, for instance from the groove marked 18a to the groove marked 21a, even when, as shown, the land portion 19a is rotatably opposite the groove 21a.

This construction therefore eliminates the necessity for over-preciseness in the tolerances of the relationships between the cooperating parts of the core barrel 10 and the cutting head 15 and results in great economy and simplification of manufacture.

Figure 4:
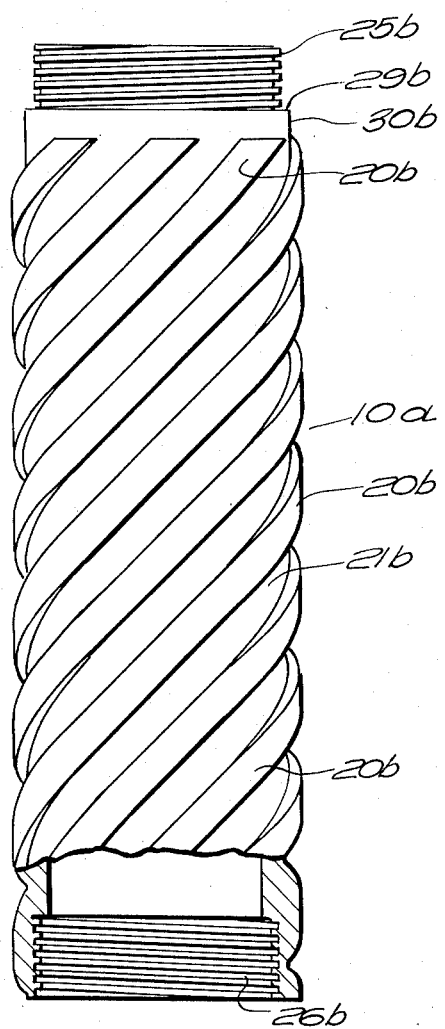
Fig. 4 is an elevation view of a core barrel extension section of the drill.
Figure 5:
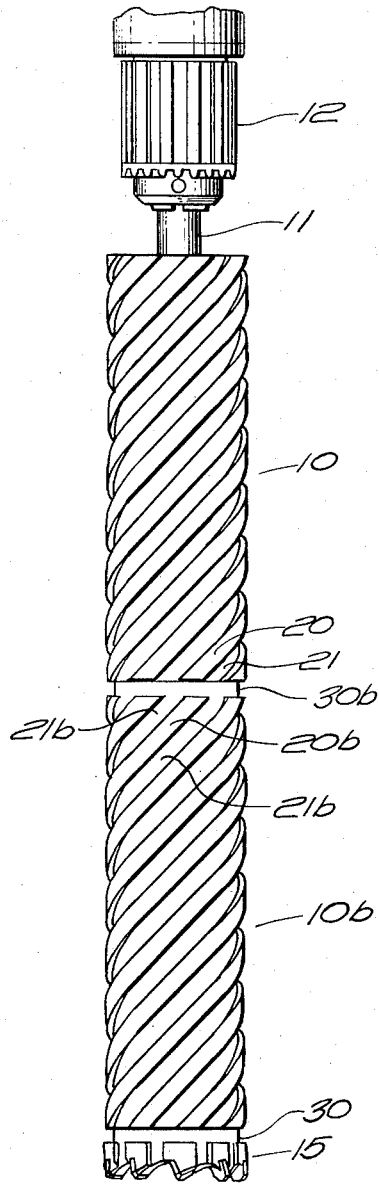
Fig. 5 is an elevation view of an extended assembled drill of the invention.

Additional features which, in combination, provide greater flexibility in the handling and use of the drill of the invention are illustrated in Figs. 4 and 5. Fig. 5 shows an assembled extended drill comprising the core barrel 10 to which are axially attached a core barrel extension 10b and, in turn, a removable cutting head 15.

The core barrel 10b is provided with helical lands 20b and grooves 21b extending lengthwise of its external surface, and internal threads 26b in its head end which are identical to the features 20, 21 and 26, but in place of the shank 11, the core barrel 10b has at its rear end an annular recess 30b which crosses the lands 20b and external threads 25b by which it may be screwed into the internal threads 26 of the core barrel 10 with its rear end surface 29b abutting against the surface 28.

When, as shown in Fig. 5, the lands 20 fall opposite or partially opposite the grooves 21b, the recess 30b nevertheless provides a free passageway for masonry particles passing from the grooves 21b to the grooves 21 and thence on toward the rear of the drill.

It will be seen that several such core barrel extensions 10b can be joined together with the core barrel 10 and the cutting head 15 further to extend the drill.

As is well known, it is easiest and most accurate to start a hole with a short drill and conversely that it is cumbersome and inaccurate to start a hole with a long drill. Heretofore, it was necessary to have on hand several drills comprising a short "starter" and several drills of progressively increasing lengths each with its own cutting head for drilling deep holes. With a drill of my invention, it is convenient and practical to drill holes of varying depths including deep holes, having on hand only one drill comprising the several component parts of the invention which are made up in a convenient length according to the desired depth of hole, or for a deep hole which are added together to extend the drill as the hole progresses.

Since the core barrels do not wear as fast as the cutting heads, the same core barrel sections may be used over and over and it may only be necessary to carry as spare parts a few extra cutting heads which are small and compact and easily handled in use and when returned for sharpening and replacement.

Another advantage of this invention is that cutting heads of various designs may be used with the same core barrel for drilling holes in materials of varying compositions and characteristics, for instance, green concrete, old concrete, brick or tile. It may be desirable that the number of cutting teeth on some such cutting heads be different from the number on others, in which case the number of flutes on the cutting heads may be different from the number of flutes on the barrel. Yet this invention allows such variable adaptations because of the clearance provided in the annular recess.

We claim:

1. A rotary masonry drill comprising, in combination, a cylindrical core barrel element and a removable cutting head element, the said elements each having flutes formed on their external surfaces for removing masonry particles, the flutes of the core barrel being helical in form and extending generally longitudinally thereof, means for attaching the cutting head element to the core barrel element, and the flutes of one of said elements terminating short of an end thereof adjacent its said attaching means to provide a portion with a smooth surface around said end, said smooth surface being free of any flutes and providing communication between the flutes of the said two elements when they are attached together in any relative rotative position of the two.

2. In the combination as set forth in claim 1, the means for attaching the cutting head element to the core barrel element comprising engageable external and internal threads in the ends of said respective elements.

3. In the combination as set forth in claim 1, the said smooth surface being formed on said cutting head element.

4. A rotary masonry drill comprising, in combination, a plurality of core barrel elements and a removable cutting head element, the core barrel elements each having helical flutes formed on their external surfaces and extending generally longitudinally thereof for removing masonry particles, means for axially attaching said elements together, the flutes of at least some of said elements terminating short of the ends thereof adjacent the said attaching means to provide portions with smooth surfaces around said ends, said smooth surfaces being free of any flutes and providing communication between the flutes of the said elements when they are attached together in any relative rotative position between them.

5. In the combination as set forth in claim 4, the means for attaching the said elements comprising engageable internal and external threads whereby the number of core barrel elements may be varied and cutting heads changed.

References Cited in the file of this patent
UNITED STATES PATENTS

| Number | Name | Date |
|---|---|---|
| 541,171 | Le Grand | June 18, 1895 |
| 648,920 | Bullock | May 8, 1900 |
| 1,290,412 | Trakimas | Jan. 7, 1919 |
| 1,477,855 | Thurston | Dec. 18, 1923 |
| 1,854,911 | Scott | Apr. 19, 1932 |
| 2,076,063 | Burt | Apr. 6, 1937 |
| 2,275,832 | Zublin | Mar. 10, 1942 |
| 2,425,132 | Stokes | Aug. 5, 1947 |
| 2,506,474 | Tilden | May 2, 1950 |
| 2,555,580 | Deely | June 5, 1951 |
| 2,673,717 | Bacon | Mar. 30, 1954 |